United States Patent
Bai

(10) Patent No.: US 10,455,411 B2
(45) Date of Patent: Oct. 22, 2019

(54) COMMUNICATION METHOD AND MOBILE TERMINAL

(71) Applicant: GUANGDONG OPPO MOBILE TELECOMMUNICATIONS CORP., LTD., Dongguan, Guangdong (CN)

(72) Inventor: Jian Bai, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 43 days.

(21) Appl. No.: 15/808,606

(22) Filed: Nov. 9, 2017

(65) Prior Publication Data

US 2018/0192284 A1    Jul. 5, 2018

(30) Foreign Application Priority Data

Dec. 30, 2016  (CN) .......................... 2016 1 1263317

(51) Int. Cl.
*H04W 8/22*   (2009.01)
*H04W 4/18*   (2009.01)
(Continued)

(52) U.S. Cl.
CPC ................ *H04W 8/22* (2013.01); *G06F 9/50* (2013.01); *H04W 4/18* (2013.01); *H04W 72/02* (2013.01); *H04W 88/02* (2013.01)

(58) Field of Classification Search
None
See application file for complete search history.

(56) References Cited

U.S. PATENT DOCUMENTS 7,310,724 B2 * 12/2007 Chen ..................... G06F 9/4405
                                                    713/1
8,516,180 B2   8/2013 Jin
(Continued)

FOREIGN PATENT DOCUMENTS

CN    103813421 A    5/2014
CN    104142907 A    11/2014
(Continued)

OTHER PUBLICATIONS

International Search Report dated Feb. 24, 2018; PCT/CN2017/115890.
(Continued)

*Primary Examiner* — Chi H Pham
*Assistant Examiner* — Vladislav Y Agureyev

(57) ABSTRACT

The embodiments of the disclosure disclose a communication method and a mobile terminal. The method is applied to a mobile terminal including an Application Processor (AP) and at least one communication processor, each of the at least one communication processor is connected to the AP, each of the at least one communication processor can be connected to at least two peripheral devices of the mobile terminal, and the mobile terminal has installed thereon a target application. The method includes: determining at least two peripheral devices needed for a data processing task of the target application; allocating a customized communication processor to the at least two peripheral devices; and when the data processing task of the target application is detected, calling the customized communication processor to perform the data processing task of the target application.

16 Claims, 9 Drawing Sheets

(51) Int. Cl.
*G06F 9/50* (2006.01)
*H04W 72/02* (2009.01)
*H04W 88/02* (2009.01)

(56) References Cited

U.S. PATENT DOCUMENTS

| | | | |
|---|---|---|---|
| 9,098,333 B1* | 8/2015 | Obrecht | G06F 9/50 |
| 9,418,044 B2* | 8/2016 | Oka | G06F 15/8007 |
| 9,955,428 B1* | 4/2018 | Bacarella | H04W 52/0258 |
| 2004/0166895 A1 | 8/2004 | Koenck | |
| 2008/0141264 A1* | 6/2008 | Johnson | G06F 9/455 |
| | | | 718/105 |
| 2009/0059899 A1 | 3/2009 | Bendelac | |
| 2009/0254901 A1* | 10/2009 | King | G06F 1/3203 |
| | | | 718/1 |
| 2010/0169562 A1 | 7/2010 | Jin | |
| 2010/0269122 A1* | 10/2010 | Malinowski | G06F 9/542 |
| | | | 719/317 |
| 2011/0131377 A1* | 6/2011 | Gray | G06F 12/084 |
| | | | 711/122 |
| 2011/0281153 A1 | 11/2011 | Jan | |
| 2011/0287753 A1* | 11/2011 | Choi | H04W 52/0254 |
| | | | 455/418 |
| 2012/0005602 A1* | 1/2012 | Anttila | G06F 3/1431 |
| | | | 715/761 |
| 2012/0102504 A1* | 4/2012 | Iyer | G06Q 10/00 |
| | | | 719/318 |
| 2012/0284732 A1* | 11/2012 | Griglock | G06F 9/5066 |
| | | | 718/104 |
| 2012/0319965 A1* | 12/2012 | Kurabayashi | G06F 9/5088 |
| | | | 345/173 |
| 2013/0117769 A1* | 5/2013 | Sharma | G06F 1/3293 |
| | | | 719/328 |
| 2013/0151840 A1* | 6/2013 | Kanigicherla | G06F 9/461 |
| | | | 713/100 |
| 2013/0173883 A1* | 7/2013 | Cho | G06F 12/1009 |
| | | | 711/207 |
| 2014/0025365 A1* | 1/2014 | Kajitani | G06F 17/5009 |
| | | | 703/24 |
| 2014/0115603 A1* | 4/2014 | Yu | H04L 47/2441 |
| | | | 718/105 |
| 2014/0244893 A1 | 8/2014 | Dickey et al. | |
| 2014/0244983 A1* | 8/2014 | McDonald | G06F 9/3005 |
| | | | 712/225 |
| 2015/0046661 A1 | 2/2015 | Gathala et al. | |
| 2015/0205644 A1* | 7/2015 | Ito | G06F 9/52 |
| | | | 718/103 |
| 2015/0268993 A1* | 9/2015 | Montesinos Ortego | G06F 9/4881 |
| | | | 718/106 |
| 2015/0356039 A1* | 12/2015 | Kris | G06F 13/385 |
| | | | 710/104 |
| 2016/0328272 A1* | 11/2016 | Ahmed | G06F 9/4881 |
| 2016/0371200 A1* | 12/2016 | Catherwood | G06F 13/102 |
| 2017/0083383 A1* | 3/2017 | Rider | G06F 9/5094 |
| 2017/0090967 A1* | 3/2017 | Ramasubramanian | G06F 9/5083 |
| 2017/0199681 A1* | 7/2017 | Jain | G06F 3/0616 |
| 2017/0364345 A1* | 12/2017 | Fontoura | G06F 8/65 |
| 2018/0136977 A1* | 5/2018 | Tsirkin | G06F 9/5016 |

FOREIGN PATENT DOCUMENTS

| | | |
|---|---|---|
| CN | 105263182 A | 1/2016 |
| CN | 105700668 A | 6/2016 |
| CN | 105791284 A | 7/2016 |
| CN | 106791152 A | 5/2017 |
| EP | 3093739 A | 11/2016 |
| JP | 4917746 B2 | 4/2012 |
| WO | 2015021037 A1 | 2/2015 |

OTHER PUBLICATIONS

English Translation of the International Search Report in international application No. PCT/CN2017/115890, dated Feb. 24, 2018.
English Translation of the Written Opinion of the International Search Authority in international application No. PCT/CN2017/115890, mailed on Feb. 24, 2018.
European Search Report in European application No. 17200534.0, dated Mar. 22, 2018.

* cited by examiner

COMMUNICATION METHOD AND MOBILE TERMINAL

CROSS-REFERENCE TO RELATED APPLICATIONS

This application is filed based upon and claims priority to Chinese Patent Application No. 201611263317.X, entitled "Communication Method and Mobile Terminal", filed on Dec. 30, 2016, the entire contents of which are incorporated herein by reference.

TECHNICAL FIELD

The disclosure relates to the technical field of electronic mobile terminal, and in particular to a communication method and a mobile terminal.

BACKGROUND

At present, information communications among various peripheral devices inside a mobile terminal are transferred via an Application Processor (AP). For example, a Radio Frequency (RF) module, a Wireless Fidelity (WIFI) module, a power module and a memory module cannot be interconnected, and communications therebetween are transferred via the AP.

For example, when a certain peripheral device needs to communicate with another peripheral device, this peripheral device sends a communication message to an AP. The AP transmits the communication message to the peripheral device to be communicated. Communications between all peripheral devices are transferred via the AP, and therefore burdens on the AP are seriously increased.

SUMMARY

The embodiments of the disclosure provide a communication method and a mobile terminal.

According to a first aspect, an embodiment of the disclosure discloses a communication method. The communication method is applied to a mobile terminal including an AP and at least one communication processor. Each of the at least one communication processor is connected to the AP, each of the at least one communication processor is capable of being connected to at least two peripheral devices of the mobile terminal, and the mobile terminal has installed thereon a target application. The method includes: determining at least two peripheral devices needed for a data processing task of the target application; allocating a customized communication processor to the at least two peripheral devices, the customized communication processor being one of the at least one communication processor included in the mobile terminal; and when the data processing task of the target application is detected, calling the customized communication processor to perform the data processing task of the target application.

According to a second aspect, an embodiment of the disclosure discloses a mobile terminal. The mobile terminal includes an AP and at least one communication processor. Each of the at least one communication processor is connected to the AP, each of the at least one communication processor is capable of being connected to at least two peripheral devices of the mobile terminal, and the mobile terminal has installed thereon a target application. The mobile terminal includes: a memory configured to store readable instructions; and one or more processors configured to execute the readable instructions to implement one or more units. The one or more units include: a determination unit configured to determine at least two peripheral devices needed for a data processing task of the target application; an allocation unit configured to allocate a customized communication processor to the at least two peripheral devices, the customized communication processor being one of the at least one communication processor included in the mobile terminal; and a calling unit configured to call, when the data processing task of the target application is detected, the customized communication processor to perform the data processing task of the target application.

According to a third aspect, an embodiment of the disclosure discloses a mobile terminal. The mobile terminal includes N communication processors, an AP, M peripheral devices and a bus. Each of the N communication processors is connected to the AP via the bus, and each of the N communication processors is capable of being connected to at least two peripheral devices of the M peripheral devices, N being a positive integer, and M being a positive integer greater than 2; and the at least two peripheral devices communicate with each other via one of the N communication processors.

According to a fourth aspect, an embodiment of the disclosure discloses a mobile terminal. The mobile terminal includes: a processor, a memory, a communication interface and a communication bus. The processor, the memory and the communication interface are connected and perform communication with each other via the communication bus. The memory stores executable program codes. The communication interface is used for wireless communication. The processor is used to call the executable program codes in the memory to execute some or all operations described in any one of the methods according to the first aspect of the embodiment of the disclosure.

According to a fifth aspect, an embodiment of the disclosure discloses a non-transitory computer-readable storage medium having stored thereon computer-executable instructions that when being executed by a processor, cause the processor to execute the communication method according to the first aspect.

BRIEF DESCRIPTION OF DRAWINGS

In order to more clearly illustrate the technical solutions in the embodiments of the disclosure or the related art, accompanying drawings needing to be used in the descriptions of the embodiments or the related art will be simply described hereinbelow. Apparently, the drawings described hereinbelow are merely some embodiments of the disclosure. Without making creative works, a person of ordinary skill in the art may also obtain other drawings according to these drawings.

FIG. 2-1 is a diagram illustrating a hardware architecture of a mobile terminal according to an embodiment of the disclosure.

FIG. 5-1 is a diagram illustrating configuration of units of a mobile terminal according to an embodiment of the disclosure.

FIG. 5-2 is a diagram illustrating configuration of units of another mobile terminal according to an embodiment of the disclosure.

DETAILED DESCRIPTION

Figure 1:
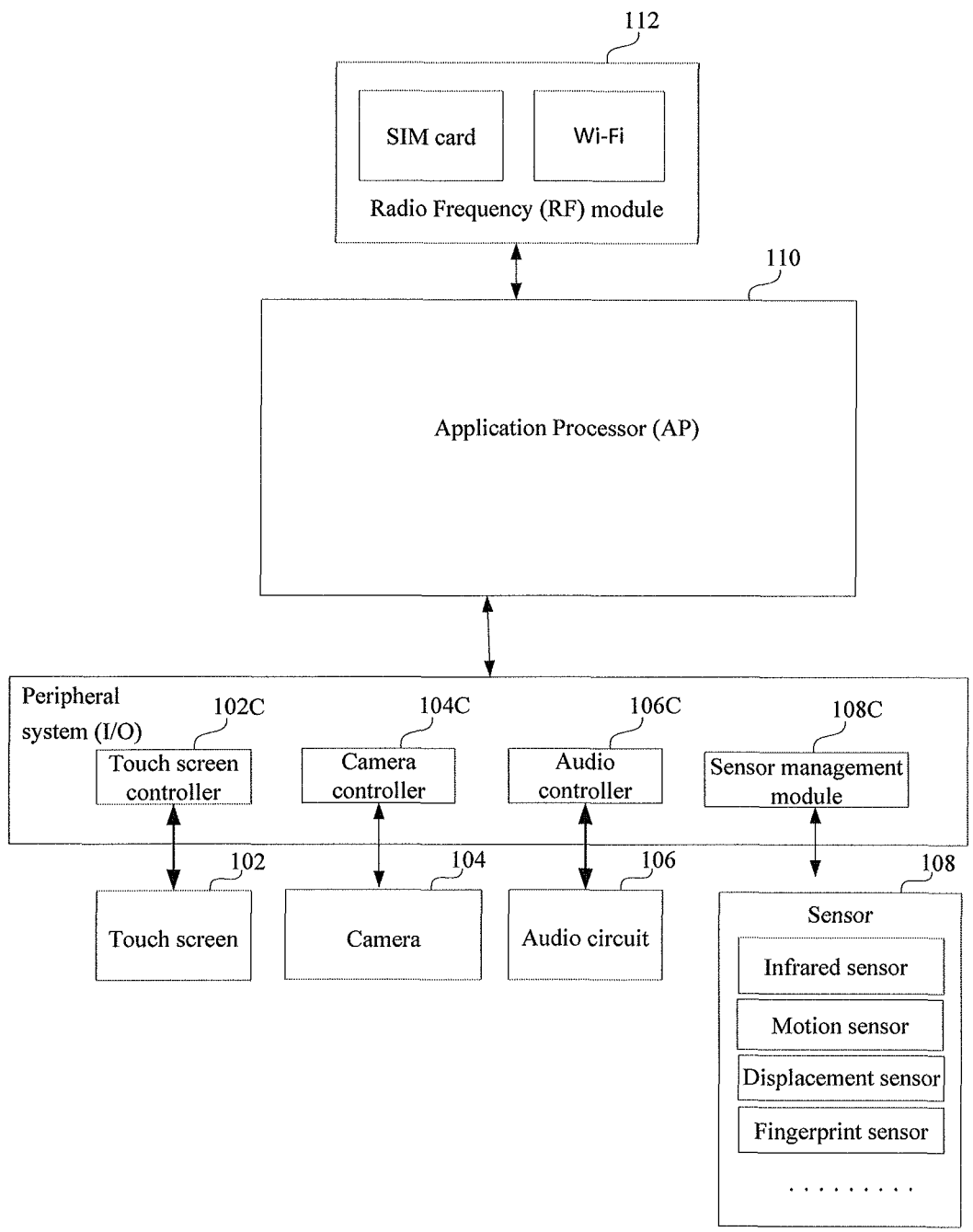
FIG. 1 is a diagram illustrating a hardware architecture of a mobile terminal in the related art.

In order to make a person skilled in the art better understand the solutions of the disclosure, the technical solutions in the embodiments of the disclosure will be clearly and completely described hereinbelow with reference to the drawings in the embodiments of the disclosure. It is apparent that the described embodiments are only a part of the embodiments of the disclosure, not all of the embodiments. On the basis of the embodiments of the disclosure, all other embodiments obtained on the premise of no creative work of a person skilled in the art should fall within the scope of protection of the disclosure.

The terms "first", "second" and the like in specification and claims of the disclosure and the drawings are used for distinguishing different objects rather than describing a specific sequence. In addition, terms "include" and "have" and any inflexions thereof are intended to refer to non-exclusive inclusions. For example, processes, methods, systems, products or devices containing a series of operations or units are not limited to operations or units which have been already listed, and other operations or units which are not listed or are inherent to these processes, methods, products or devices are optionally included instead.

Mentioning of "Embodiments" in the disclosure means that specific features, structures or characteristics described in the embodiments may be included in at least one embodiment of the disclosure. The phrase occurring at each position in the specification does not always refer to the same embodiment, or not an independent or alternative embodiment mutually exclusive to other embodiments. A person skilled in the art explicitly and implicitly understands that the embodiments described in the disclosure may be combined with other embodiments.

The embodiments of the disclosure provide a communication method and a mobile terminal.

At least some embodiments of the disclosure provide a communication method, applied to a mobile terminal comprising an Application Processor (AP) and at least one communication processor, each of the at least one communication processor being connected to the AP, each of the at least one communication processor capable of being connected to at least two peripheral devices of the mobile terminal, the mobile terminal having installed thereon a target application, the method comprising: determining at least two peripheral devices needed for a data processing task of the target application; allocating a customized communication processor to the at least two peripheral devices, the customized communication processor being one of the at least one communication processor comprised in the mobile terminal; and when the data processing task of the target application is detected, calling the customized communication processor to perform the data processing task of the target application.

According to at least some embodiments, the allocating a customized communication processor to the at least two peripheral devices comprises: determining a communication processor, with the lowest usage frequency, of the at least one communication processor; and determining the communication processor with the lowest usage frequency as a dedicated communication processor for the at least two peripheral devices needed for the data processing task of the target application, the dedicated communication processor dedicating to providing communication service for the at least two peripheral devices.

According to at least some embodiments, the method further comprises: determining a high-frequency usage time period of the target application, wherein the determining the communication processor with the lowest usage frequency as a dedicated communication processor for the at least two peripheral devices needed for the data processing task of the target application comprises: determining the communication processor with the lowest usage frequency as a dedicated communication processor for the at least two peripheral devices needed for the data processing task of the target application within the high-frequency usage time period.

According to at least some embodiments, the determining a high-frequency usage time period of the target application comprises: acquiring usage information about the target application within a predetermined time period; and determining the high-frequency usage time period of the target application on the basis of the usage information about the target application within the predetermined time period.

According to at least some embodiments, the allocating a customized communication processor to the at least two peripheral devices comprises: selecting a target communication processor, the target communication processor being one of the at least one communication processor comprised in the mobile terminal; and determining the selected target communication processor as a preempted communication processor for at least two peripheral devices needed for the data processing task of the target application, the at least two peripheral devices of the target application having priority higher than that of other peripheral devices comprised in the mobile terminal in terms of using communication service of the preempted communication processor.

According to at least some embodiments, the method further comprises: determining a high-frequency usage time period of the target application, wherein determining the selected target communication processor as a preempted communication processor for at least two peripheral devices needed for the data processing task of the target application comprises: determining the communication processor with the lowest usage frequency as a preempted communication processor for at least two peripheral devices needed for the data processing task of the target application within the high-frequency usage time period.

According to at least some embodiments, the determining a high-frequency usage time period of the target application comprises: acquiring usage information about the target application within a predetermined time period; and determining the high-frequency usage time period of the target application on the basis of the usage information about the target application within the predetermined time period.

According to at least some embodiments, the method further comprises: acquiring usage information about at least one application installed on the mobile terminal; and determining an application, of which the usage information is greater than a predetermined usage information threshold, as the target application, according to the usage information about at least one application installed on the mobile terminal.

According to at least some embodiments, the usage information is a usage count of the at least one application within a predetermined time period, or a Central Processing Unit (CPU) occupancy during running of the at least one application.

At least some embodiments of the disclosure provide a mobile terminal, comprising an Application Processor (AP) and at least one communication processor, each of the at least one communication processor being connected to the AP, each of the at least one communication processor capable of being connected to at least two peripheral devices of the mobile terminal, the mobile terminal having installed thereon a target application, the mobile terminal further comprising: a memory configured to store readable instructions; and one or more processors configured to execute the readable instructions to implement one or more units, the one or more units comprising: a determination unit configured to determine at least two peripheral devices needed for a data processing task of the target application; an allocation unit configured to allocate a customized communication processor to the at least two peripheral devices, the customized communication processor being one of the at least one communication processor comprised in the mobile terminal; and a calling unit configured to call, when the data processing task of the target application is detected, the customized communication processor to perform the data processing task of the target application.

According to at least some embodiments, the allocation unit is specifically configured to determine a communication processor, with the lowest usage frequency, of the at least one communication processor; and determine the communication processor with the lowest usage frequency as a dedicated communication processor for the at least two peripheral devices needed for the data processing task of the target application, the dedicated communication processor dedicating to providing communication service for the at least two peripheral devices.

According to at least some embodiments, the one or more processors are further configured to execute the readable instructions to implement a first learning unit configured to determine a high-frequency usage time period of the target application; and wherein the allocation unit is specifically configured to determine, when determining the communication processor with the lowest usage frequency as a dedicated communication processor for the at least two peripheral devices needed for the data processing task of the target application, the communication processor with the lowest usage frequency as a dedicated communication processor for the at least two peripheral devices needed for the data processing task of the target application within the high-frequency usage time period.

According to at least some embodiments, the first learning unit is configured to acquire usage information about the target application within a predetermined time period; and determine a high-frequency usage time period of the target application on the basis of the usage information about the target application within the predetermined time period.

According to at least some embodiments, the allocation unit is specifically configured to select a target communication processor, the target communication processor being one of the at least one communication processor comprised in the mobile terminal; and determine the selected target communication processor as a preempted communication processor for at least two peripheral devices needed for the data processing task of the target application, the at least two peripheral devices of the target application having priority higher than that of other peripheral devices comprised in the mobile terminal in terms of using communication service of the preempted communication processor.

According to at least some embodiments, the one or more processors are further configured to execute the readable instructions to implement a second learning unit configured to determine a high-frequency usage time period of the target application; and wherein the allocation unit is specifically configured to determine, when determining the selected target communication processor as a preempted communication processor for at least two peripheral devices needed for the data processing task of the target application, the communication processor with the lowest usage frequency as a preempted communication processor for at least two peripheral devices needed for the data processing task of the target application within the high-frequency usage time period.

According to at least some embodiments, the second learning unit is configured to acquire usage information about the target application within a predetermined time period; and determine a high-frequency usage time period of the target application on the basis of the usage information about the target application within the predetermined time period.

According to at least some embodiments, the one or more processors are further configured to execute the readable instructions to implement a target application determination unit configured to acquire usage information about at least one application installed on the mobile terminal; and determine an application, of which the usage information is greater than a predetermined usage information threshold, as the target application, according to the usage information about at least one application installed on the mobile terminal.

According to at least some embodiments, the usage information is a usage count of the at least one application within a predetermined time period, or a Central Processing Unit (CPU) occupancy during running of the at least one application.

At least some embodiments of the disclosure provide a mobile terminal, comprising N communication processors, an Application Processor (AP), M peripheral devices and a bus, wherein each of the N communication processors is connected to the AP via the bus, and each of the N communication processors is capable of being connected to at least two peripheral devices of the M peripheral devices, N being a positive integer, and M being a positive integer greater than 2; and the at least two peripheral devices communicate with each other via one of the N communication processors.

At least some embodiments of the disclosure provide a mobile terminal. The mobile terminal includes: a processor, a memory, a communication interface and a communication bus. The processor, the memory and the communication interface are connected and perform communication with each other via the communication bus. The memory stores executable program codes. The communication interface is used for wireless communication. The processor is used to call the executable program codes in the memory to execute some or all operations described in any one of the methods according to the first aspect of the embodiment of the disclosure.

At least some embodiments of the disclosure provide a non-transitory computer-readable storage medium having stored thereon computer-executable instructions that when being executed by a processor, cause the processor to execute the communication method according to the first aspect.

In order to better understand a communication method and a mobile terminal disclosed in the embodiments of the disclosure, the communication method and the mobile terminal provided in the embodiments of the disclosure will be described in detail hereinbelow with reference to FIG. 1 to FIG. 7.

FIG. 1 is a diagram illustrating a hardware architecture of a terminal in the related art. As illustrated in FIG. 1, the hardware architecture in the related art includes an AP 110 and a peripheral system. The peripheral system includes a plurality of peripheral devices such as a touch screen (e.g., suspending touch screen) 102, a camera 104 (e.g., three-dimensional camera), an audio circuit 106, a sensor 108 and an RF module 112, as well as a touch screen controller 102C, a camera controller 104C, an audio controller 106C and a sensor management module 108C.

Each of the peripheral devices is connected to the AP 110. When a certain peripheral device needs to communicate with another peripheral device, this peripheral device sends a communication request to the AP 110. The AP 110 analyzes the communication request to determine a target peripheral device corresponding to the communication request. The AP 110 forwards the communication request to the target peripheral device for being processed. Optionally, the communication request may be intended to acquire data from the target peripheral device, or to control the target peripheral device to perform corresponding operations and the like.

It can thus be seen that in the related art, communications between all peripheral devices need to be transferred via the AP 110, thereby greatly increasing loads on the AP 110.

Figure 2:
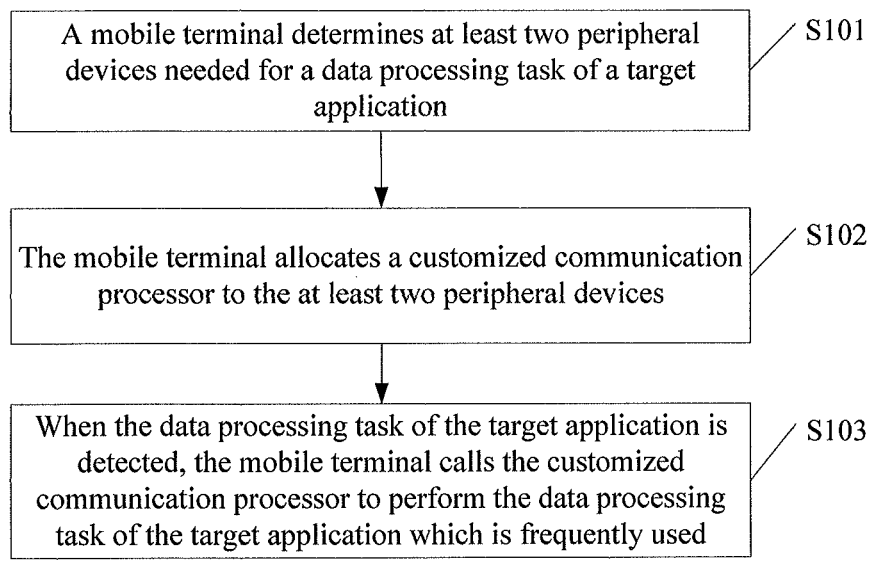
FIG. 2 is a flowchart illustrating a communication method according to an embodiment of the disclosure.
Figures 1, 2:
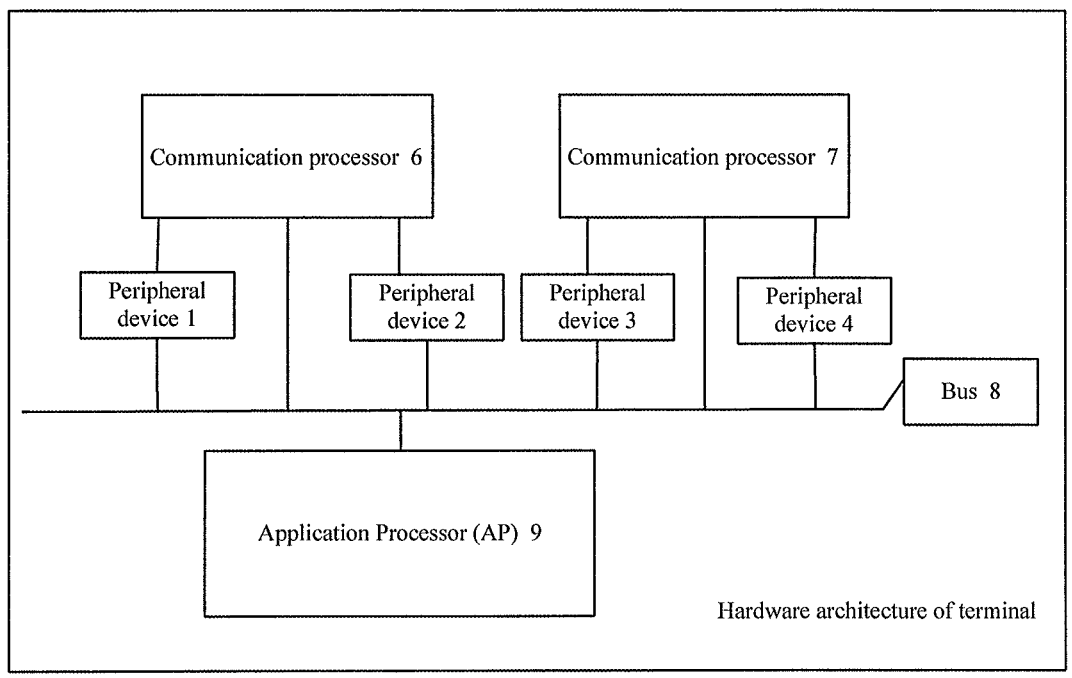

FIG. 2 is a flowchart illustrating a communication method according to an embodiment of the disclosure. The communication method according to the embodiment of the disclosure is applied to a mobile terminal including an AP and at least one communication processor. The at least one communication processor is connected to the AP. Any one of the at least one communication processor is capable of being connected to at least two peripheral devices of the mobile terminal. The mobile terminal has installed thereon a target application. As illustrated in FIG. 2, the communication method according to the embodiment of the disclosure includes the operations as illustrated in blocks S101 to S103.

In block S101, a mobile terminal determines at least two peripheral devices needed for a data processing task of the target application.

Herein, the target application may be selected from a group consisting of various applications installed on the mobile terminal such as a WeChat application, iQIYI and a UC browser. The application may be predetermined by a user, or selected by the mobile terminal according to a predetermined policy. The predetermined policy may be, for example, to select a target application of which application usage information (e.g., count, frequency and duration) is greater than a predetermined parameter within a predetermined time period. The application determined according to the predetermined policy may be an application (e.g., the WeChat application) that is frequently used by a user. A specific implementations that the mobile terminal selects the target application is not uniquely limited in the embodiment of the disclosure.

Here, the mobile terminal may acquire usage information about at least one application installed on the mobile terminal. According to the usage information about at least one application installed on the mobile terminal, the mobile terminal may determine an application, of which the usage information is greater than a predetermined usage information threshold, as the target application. Here, the usage information may be a usage count within a predetermined time period, or a Central Processing Unit (CPU) occupancy during running of the application. For example, the target application may be an application of which the usage count within a predetermined time period is greater than a predetermined usage count threshold. Alternatively, the target application may be an application of which the CPU occupancy during running is greater than a CPU occupancy threshold.

The peripheral device may include, but not limited to, an RF module, a WIFI module, a power supply, a memory, a camera, a touch screen, an audio playing module, a sensor and a display screen.

In block S102, the mobile terminal allocates a customized communication processor to the at least two peripheral devices. The customized communication processor is one of the at least one communication processor included in the mobile terminal.

The customized communication processor allocated to the at least two peripheral devices by the mobile terminal may be a dedicated communication processor, or a preempted communication processor. The customized communication processor may be one of the at least one communication processor included in the mobile terminal. Here, the dedicated communication processor dedicates to providing service for the at least two peripheral devices. The preempted communication processor preferentially provides communication service for at least two peripheral devices of the target application during running of the target application and other applications simultaneously. In other word, in terms of using the communication service of the preempted communication processor, the at least two peripheral devices of the target application have priorities higher than the priorities of the peripheral devices of other applications of the mobile terminal. For example, when at least two peripheral devices needed for the data processing task of the target application include a peripheral device 1 and a peripheral device 2, the mobile terminal allocates a customized communication processor to the peripheral device 1 and the peripheral device 2. The peripheral device 1 sends an access instruction to the peripheral device 2 via the customized communication processor. The access instruction may be a data instruction or a control instruction. After receiving the access instruction, the peripheral device 2 executes an operation corresponding to the access instruction.

Specifically, as an alternative implementation, in a specific implementation manner of allocating the customized communication processor to the at least two peripheral devices, a communication processor, with the lowest usage frequency, of the at least one communication processor may be determined. Then, the communication processor with the lowest usage frequency may be determined as a dedicated communication processor for the at least two peripheral devices needed for the data processing task of the target application. Alternatively, usage information about the target application within a predetermined time period is acquired, and a high-frequency usage time period of the target application is determined on the basis of the usage information about the target application within the predetermined time period. The communication processor with the lowest usage frequency is determined as a dedicated communication processor for the at least two peripheral devices needed for the data processing task of the target application within the high-frequency usage time period.

As an alternative implementation manner, in a specific implementation manner of allocating the customized communication processor to the at least two peripheral devices, a target communication processor may be selected, which is one of the at least one communication processor included in the mobile terminal. Then, the selected target communication processor is determined as a preempted communication processor for at least two peripheral devices needed for the data processing task of the target application. Alternatively, usage information about the target application within a predetermined time period is acquired, and a high-frequency usage time period of the target application is determined on the basis of the usage information about the target application within the predetermined time period. The communication processor with the lowest usage frequency is determined as a preempted communication processor for at least two peripheral devices needed for the data processing task of the target application within the high-frequency usage time period.

In block S103, when the data processing task of the target application is detected, the mobile terminal calls the customized communication processor to perform the data processing task of the target application.

The mobile terminal according to the embodiment of the disclosure may include N communication processors, an AP, M peripheral devices and a bus. The N communication processors are connected to the AP via the bus. Each of the N communication processors is capable of being connected to at least two peripheral devices of the M peripheral devices. N is a positive integer, and M is a positive integer greater than 2. Here, the at least two peripheral devices communicate with each other via one of the N communication processors. As illustrated in FIG. 2-1, a new hardware architecture of the mobile terminal is illustrated with four peripheral devices. It will be understood that the four peripheral devices here are only taken as an example, and the quantity of the peripheral devices may be another number. A peripheral device 1 and a peripheral device 2 are connected to a communication processor 6. A peripheral device 3 and a peripheral device 4 are connected to a communication processor 7. Both the communication processor 6 and the communication processor 7 are connected with a bus 8. The peripheral device 1, the peripheral device 2, the peripheral device 3, the peripheral device 4 and an AP 9 are connected to the bus respectively.

It can be seen that the communication method according to the embodiment of the disclosure may be applied to a mobile terminal including an AP and at least one communication processor. The at least one communication processor is connected to the AP. Each of the at least one communication processor is capable of being connected to at least two peripheral devices of the mobile terminal. The mobile terminal has installed thereon a target application. The mobile terminal determines at least two peripheral devices needed for a data processing task of the target application. The mobile terminal allocates a customized communication processor to the at least two peripheral devices. When the data processing task of the target application is detected, the mobile terminal calls the customized communication processor to perform the data processing task of the target application. As such, at least two peripheral devices needed for the data processing task of the target application may perform communication on the basis of the customized communication processor, thereby eliminating a necessity of transferring communication through an AP, reducing load on the AP and improving the communication efficiency.

Figure 3:
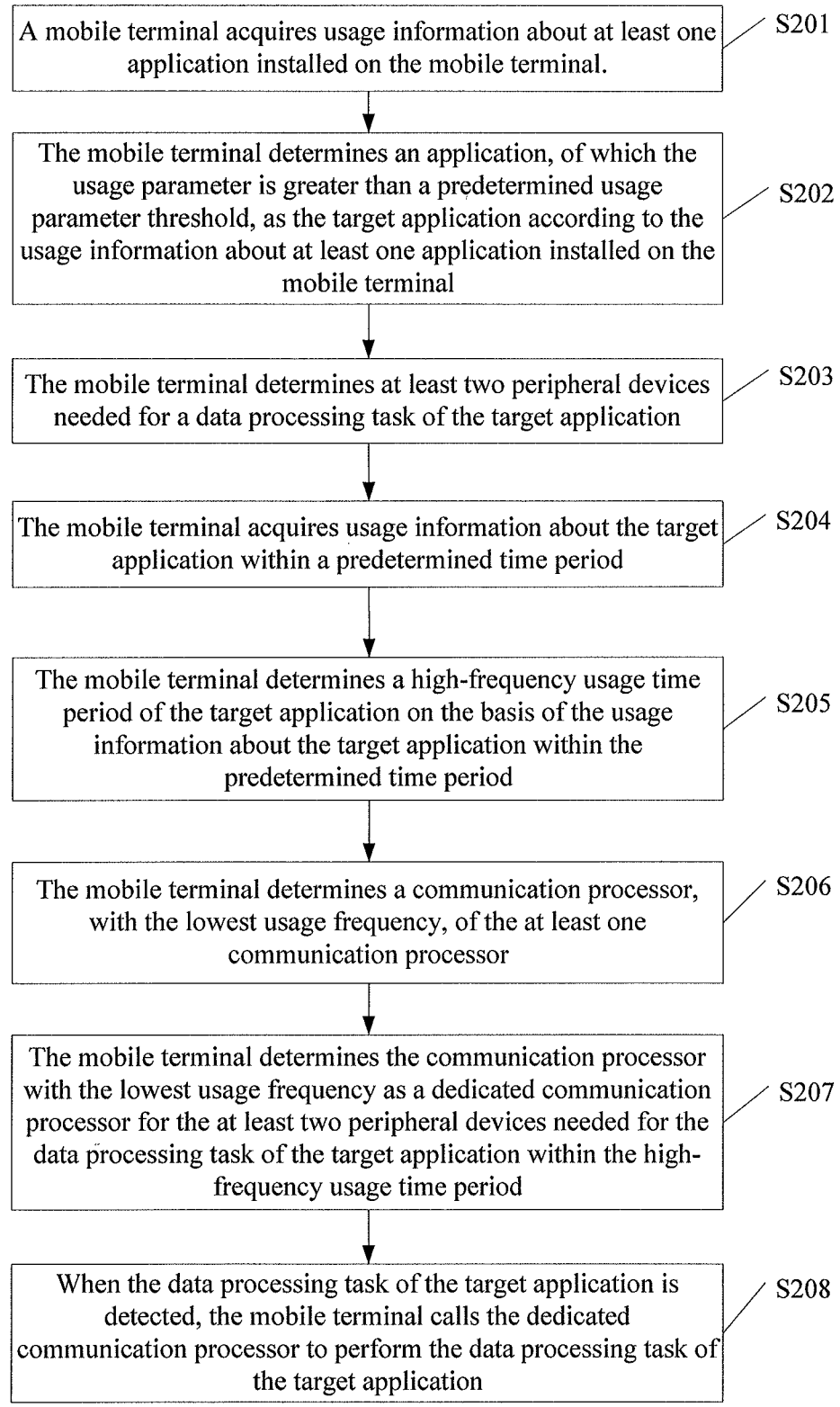
FIG. 3 is a flowchart illustrating another communication method according to an embodiment of the disclosure.

On the basis of the embodiment as illustrated in FIG. 2, a communication method as illustrated in FIG. 3 is provided. FIG. 3 is a flowchart illustrating another communication method according to an embodiment of the disclosure. The communication method according to the embodiment of the disclosure is applied to a mobile terminal including an AP and at least one communication processor. The at least one communication processor is connected to the AP. Each of the at least one communication processor is capable of being connected to at least two peripheral devices of the mobile terminal. The mobile terminal has installed thereon a target application. As illustrated in FIG. 3, the communication method according to the embodiment of the disclosure includes the operations as illustrated in blocks S201 to S203.

In block S201, the mobile terminal acquires usage information about at least one application installed on the mobile terminal.

In block S202, the mobile terminal determines an application, of which the usage information is greater than a predetermined usage information threshold, as the target application according to the usage information about at least one application installed on the mobile terminal.

In block S203, the mobile terminal determines at least two peripheral devices needed for a data processing task of the target application.

In block S204, the mobile terminal acquires usage information about the target application within a predetermined time period.

In block S205, the mobile terminal determines a high-frequency usage time period of the target application on the basis of the usage information about the target application within the predetermined time period.

In block S206, the mobile terminal determines a communication processor, with the lowest usage frequency, of the at least one communication processor.

In block S207, the mobile terminal determines the communication processor with the lowest usage frequency as a dedicated communication processor for the at least two peripheral devices needed for the data processing task of the target application within the high-frequency usage time period.

In block S208, when the data processing task of the target application is detected, the mobile terminal calls the dedicated communication processor to perform the data processing task of the target application.

It can be seen that the communication method according to the embodiment of the disclosure is applied to a mobile terminal including an AP and at least one communication processor. The at least one communication processor is connected to the AP. Each of the at least one communication processor is capable of being connected to at least two peripheral devices of the mobile terminal. The mobile terminal has installed thereon a target application. The mobile terminal determines at least two peripheral devices needed for a data processing task of the target application. The mobile terminal allocates a customized communication processor to the at least two peripheral devices. When the data processing task of the target application is detected, the mobile terminal calls the customized communication processor to perform the data processing task of the target application. As such, at least two peripheral devices needed for the data processing task of the target application may perform communication on the basis of the customized communication processor, thereby eliminating a necessity of transferring communication through an AP, reducing load on the AP and improving the communication efficiency.

Figure 4:
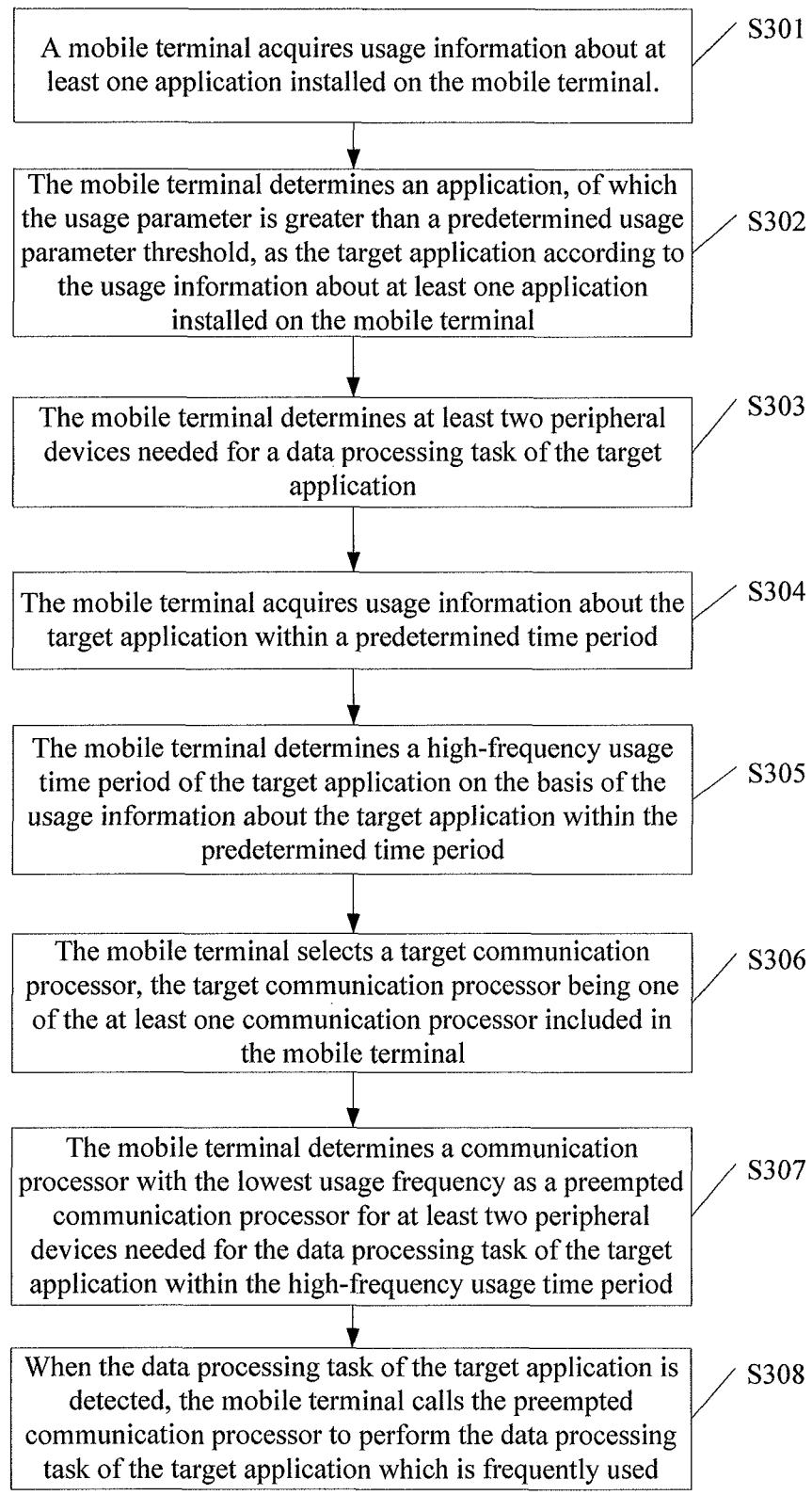
FIG. 4 is a flowchart illustrating another communication method according to an embodiment of the disclosure.

On the basis of the embodiment as illustrated in FIG. 2, another communication method as illustrated in FIG. 4 is provided. FIG. 4 is a flowchart illustrating another communication method according to an embodiment of the disclosure. The communication method according to the embodiment of the disclosure is applied to a mobile terminal including an AP and at least one communication processor. The at least one communication processor is connected to the AP. Each of the at least one communication processor is capable of being connected to at least two peripheral devices of the mobile terminal. The mobile terminal has installed thereon a target application. As illustrated in FIG. 4, the communication method according to the embodiment of the disclosure includes the operations as illustrated in the following blocks.

In block S301, the mobile terminal acquires usage information about at least one application installed on the mobile terminal.

In block S302, the mobile terminal determines an application, of which the usage information is greater than a predetermined usage information threshold, as the target application according to the usage information about at least one application installed on the mobile terminal.

In block S303, the mobile terminal determines at least two peripheral devices needed for a data processing task of the target application.

In block S304, the mobile terminal acquires usage information about the target application within a predetermined time period.

In block S305, the mobile terminal determines a high-frequency usage time period of the target application on the basis of the usage information about the target application within the predetermined time period.

In block S306, the mobile terminal selects a target communication processor, which is one of the at least one communication processor included in the mobile terminal.

In block S307, the mobile terminal determines a communication processor with the lowest usage frequency as a preempted communication processor for at least two peripheral devices needed for the data processing task of the target application within the high-frequency usage time period.

In block S308, when the data processing task of the target application is detected, the mobile terminal calls the preempted communication processor to perform the data processing task of the target application.

It can be seen that the communication method according to the embodiment of the disclosure is applied to a mobile terminal including an AP and at least one communication processor. The at least one communication processor is connected to the AP. Each of the at least one communication processor is capable of being connected to at least two peripheral devices of the mobile terminal. The mobile terminal has installed thereon a target application. The mobile terminal determines at least two peripheral devices needed for a data processing task of the target application. The mobile terminal allocates a customized communication processor to the at least two peripheral devices. When the data processing task of the target application is detected, the mobile terminal calls the customized communication processor to perform the data processing task of the target application. As such, at least two peripheral devices needed for the data processing task of the target application may perform communication on the basis of the customized communication processor, thereby eliminating a necessity of transferring communication through an AP, reducing load on the AP and improving the communication efficiency.

Figures 1, 5:
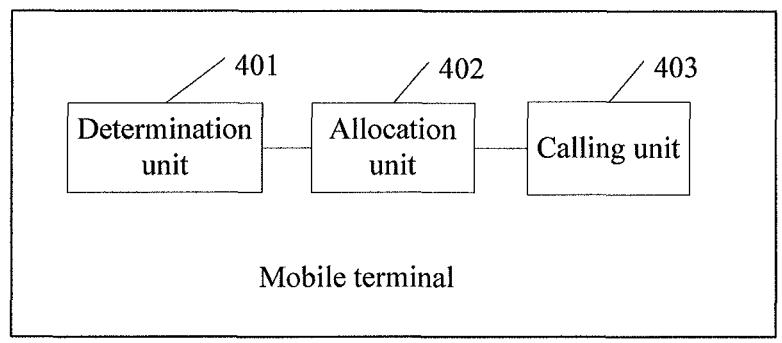
Figures 2, 5:
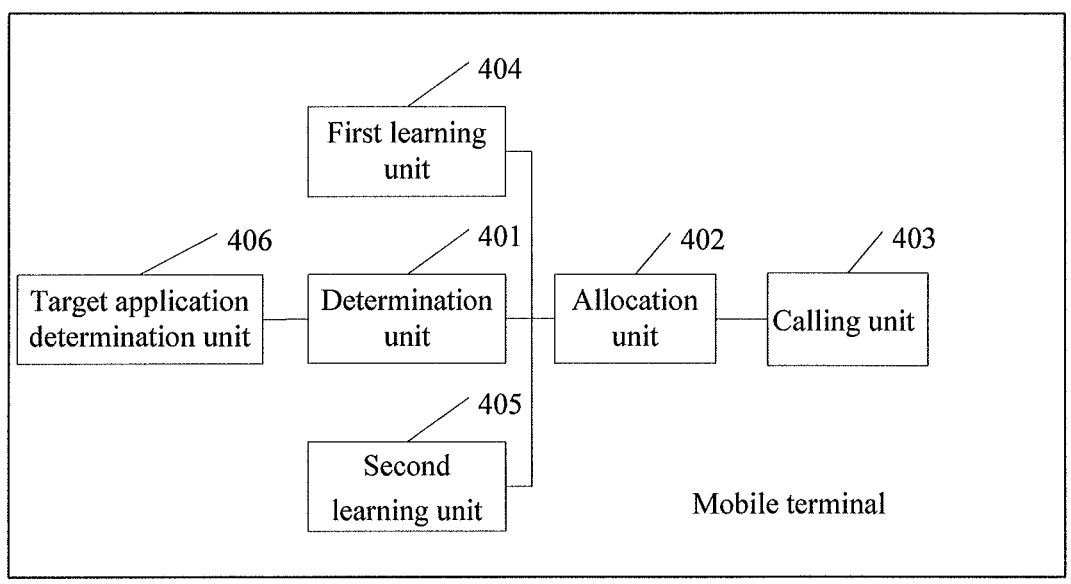

The apparatus embodiment of the disclosure is illustrated hereinbelow. The apparatus embodiment of the disclosure is used to execute the method implemented in the method embodiment of the disclosure. The mobile terminal includes an AP and at least one communication processor. The at least one communication processor is connected to the AP. Each of the at least one communication processor is capable of being connected to at least two peripheral devices of the mobile terminal. The mobile terminal has installed thereon a target application. FIG. 5-1 is a diagram illustrating configuration of units of a mobile terminal according to an embodiment of the disclosure. As illustrated in FIG. 5-1, the mobile terminal may include a determination unit 401, an allocation unit 402 and a calling unit 403.

The determination unit 401 is configured to determine at least two peripheral devices needed for a data processing task of the target application.

The allocation unit 402 is configured to allocate a customized communication processor to the at least two peripheral devices.

The calling unit 403 is configured to call, when the data processing task of the target application is detected, the customized communication processor to perform the data processing task of the target application.

FIG. 5-2 is a diagram illustrating configuration of units of another mobile terminal according to an embodiment of the disclosure. As illustrated in FIG. 5-2, the mobile terminal may include the determination unit 401, the allocation unit 402 and the calling unit 403 in the embodiment corresponding to FIG. 5-1.

Optionally, the allocation unit 402 may be configured to determine a communication processor, with the lowest usage frequency, of the at least one communication processor. The allocation unit 402 may be configured to determine the communication processor with the lowest usage frequency as a dedicated communication processor for the at least two peripheral devices needed for the data processing task of the target application.

Optionally, the mobile terminal may further include a first learning unit 404.

The first learning unit 404 may be configured to acquire usage information about the target application within a predetermined time period; and determine a high-frequency usage time period of the target application on the basis of the usage information about the target application within the predetermined time period.

The allocation unit 402 is specifically configured to determine, when determining the communication processor with the lowest usage frequency as a dedicated communication processor for the at least two peripheral devices needed for the data processing task of the target application, the communication processor with the lowest usage frequency as a dedicated communication processor for the at least two peripheral devices needed for the data processing task of the target application within the high-frequency usage time period.

Optionally, the allocation unit 402 is specifically configured to select a target communication processor. The target communication processor is one of the at least one communication processor included in the mobile terminal. The allocation unit 402 may determine the selected target communication processor as a preempted communication processor for at least two peripheral devices needed for the data processing task of the target application.

Optionally, the mobile terminal may further include a second learning unit 405.

The second learning unit 405 may be configured to acquire usage information about the target application within a predetermined time period; and determine a high-frequency usage time period of the target application on the basis of the usage information about the target application within the predetermined time period.

In the process of determining the selected target communication processor as a preempted communication processor for at least two peripheral devices needed for the data processing task of the target application, the allocation unit 402 is specifically configured to determine the communication processor with the lowest usage frequency as a preempted communication processor for at least two peripheral devices needed for the data processing task of the target application within the high-frequency usage time period.

Optionally, the mobile terminal further includes a target application determination unit 406.

The target application determination unit 406 may be configured to acquire usage information about at least one application installed on the mobile terminal; and determine an application, of which the usage information is greater than a predetermined usage information threshold, as the target application according to the usage information about at least one application installed on the mobile terminal.

Specifically, specific implementation of each unit may refer to description of relevant operations in the embodiments corresponding to FIG. 1 to FIG. 3, and will not be elaborated herein.

It is to be noted that the mobile terminal described in the apparatus embodiment of the disclosure is presented in a form of function unit. The term "unit" used here should be interpreted as a meaning as wide as possible. An object for implementing functions described for each "unit" may be, for example, an Application Specific Integrated Circuit (ASIC), a single circuit, a processor (e.g. shared, dedicated or chip group) for executing one or more software or firmware programs and a memory, a combined logic circuit, and/or other appropriate components for providing and implementing the above-mentioned functions.

Figure 6:
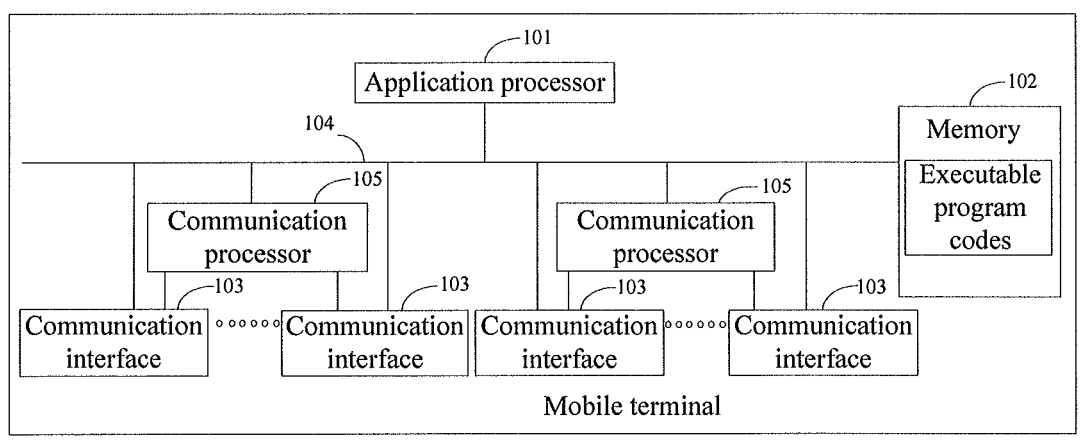
FIG. 6 is a structure diagram illustrating a mobile terminal according to an embodiment of the disclosure.

For example, the function of determining, by the determination unit 401, at least two peripheral devices needed for the data processing task of the target application may be implemented by the mobile terminal as illustrated in FIG. 6. Specifically, a processor 101 may call executable program codes in a memory 102 to determine at least two peripheral devices needed for the data processing task of the target application It can be seen that the communication method according to the embodiment of the disclosure may be applied to a mobile terminal including an AP and at least one communication processor. The at least one communication processor is connected to the AP. Each of the at least one communication processor is capable of being connected to at least two peripheral devices of the mobile terminal. The mobile terminal has installed thereon a target application. The mobile terminal determines at least two peripheral devices needed for a data processing task of the target application. The mobile terminal allocates a customized communication processor to the at least two peripheral devices. When the data processing task of the target application is detected, the customized communication processor is called to perform the data processing task of the target application. As can be seen, at least two peripheral devices needed for the data processing task of the target application may perform communication on the basis of the customized communication processor, thereby eliminating a necessity of transferring communication through an AP, reducing load on the AP and improving the communication efficiency.

Figure 7:
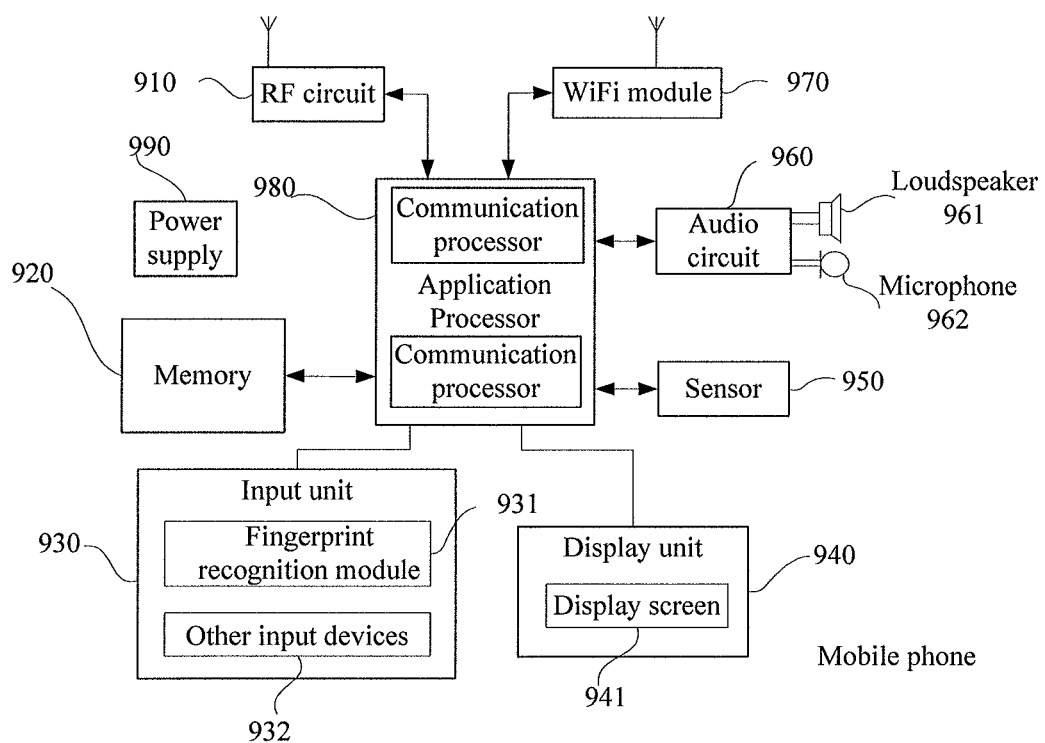
FIG. 7 is a structure diagram illustrating another mobile terminal according to an embodiment of the disclosure.

The embodiment of the disclosure also provides another mobile terminal. The mobile terminal includes N communication processors and an AP. The N communication processors are connected to the AP. Each of the N communication processors is capable of being connected to at least two peripheral devices (e.g., communication interface) of the mobile terminal. N is a positive integer. As illustrated in FIG. 7, the mobile terminal may include an AP 101, a memory 102, a communication interface 103, a communication processor 105 and a communication bus 104. The AP 101, the memory 102 and the communication interface 103 are connected and perform communication with each other via the communication bus 104. The AP 101 controls wireless communication with an external cellular network via the communication interface 103. The communication interface 103 includes, but is not limited to, an antenna, an amplifier, a transceiver, a coupler, a Low Noise Amplifier (LNA), a duplexer, etc. The memory 102 may include at least one of a Random Access Memory (RAM), a nonvolatile memory and an external memory. The memory 102 stores executable program codes. The executable program codes can guide the AP 101 to execute the communication method specifically disclosed in the method embodiment of the disclosure.

The AP 101 is configured to determine at least two peripheral devices needed for a data processing task of the target application; and allocate a customized communication processor to the at least two peripheral devices. When the data processing task of the target application is detected, the AP 101 is configured to call the customized communication processor to perform the data processing task of the target application.

Optionally, in the process of allocating the customized communication processor to the at least two peripheral devices, the AP 101 is specifically configured to determine a communication processor, with the lowest usage frequency, of the at least one communication processor. The AP 101 is configured to determine the communication processor with the lowest usage frequency as a dedicated communication processor for the at least two peripheral devices needed for the data processing task of the target application.

Optionally, the AP 101 may also be configured to acquire usage information about the target application within a predetermined time period. The AP 101 determines a high-frequency usage time period of the target application on the basis of the usage information about the target application within the predetermined time period.

In the process of determining the communication processor with the lowest usage frequency as a dedicated communication processor for the at least two peripheral devices needed for the data processing task of the target application, the AP 101 is specifically configured to configure the communication processor with the lowest usage frequency as a dedicated communication processor for the at least two peripheral devices needed for the data processing task of the target application within the high-frequency usage time period.

Optionally, in the process of allocating the customized communication processor to the at least two peripheral devices, the AP 101 is specifically configured to select a target communication processor. The target communication processor is one of the at least one communication processor included in the mobile terminal. The AP 101 configures the selected target communication processor as a preempted communication processor for at least two peripheral devices needed for the data processing task of the target application.

Optionally, the AP 101 may also be configured to acquire usage information about the target application within a predetermined time period. The AP 101 may determine a high-frequency usage time period of the target application on the basis of the usage information about the target application within the predetermined time period.

In the process of determining the selected target communication processor as a preempted communication processor for at least two peripheral devices needed for the data processing task of the target application, the AP 101 is specifically configured to determine the communication processor with the lowest usage frequency as a preempted communication processor for at least two peripheral devices needed for the data processing task of the target application within the high-frequency usage time period.

Optionally, the AP 101 may also be configured to acquire usage information about at least one application installed on the mobile terminal. The AP 101 may determine an application, of which the usage information is greater than a predetermined usage information threshold, as the target application according to the usage information about at least one application installed on the mobile terminal.

Specifically, for specific implementation of various units, reference may be made to description of relevant operations in the embodiments corresponding to FIGS. 2 to 4, and detailed description on the specific implementation of the various units will not be made herein.

It can be seen that the communication method according to the embodiment of the disclosure is applied to a mobile terminal including an AP and at least one communication processor. The at least one communication processor is connected to the AP. Each of the at least one communication processor is capable of being connected to at least two peripheral devices of the mobile terminal. The mobile terminal has installed thereon a target application. The mobile terminal determines at least two peripheral devices needed for a data processing task of the target application. The mobile terminal allocates a customized communication processor to the at least two peripheral devices. When the data processing task of the target application is detected, the mobile terminal calls the customized communication processor to perform the data processing task of the target application. As such, at least two peripheral devices needed for the data processing task of the target application may perform communication on the basis of the customized communication processor, thereby eliminating a necessity of transferring communication through an AP, reducing load on the AP and improving the communication efficiency.

The embodiments of the disclosure also provide another mobile terminal. As illustrated in FIG. 7, for convenience of description, only parts associated with the embodiments of the disclosure are shown. For specific technical details that are not disclosed, reference may be made to parts of the method in the embodiments of the disclosure. The mobile terminal may be any of terminal devices including a mobile phone, a tablet computer, a Personal Digital Assistant (PDA), a Point of Sales (POS), an on-board computer and the like. A mobile phone is taken as an example of the mobile terminal.

FIG. 7 illustrates a partial structure diagram illustrating a mobile phone associated with a mobile terminal according to an embodiment of the disclosure. As illustrated in FIG. 7, the mobile phone includes an RF circuit 910, a memory 920, an input unit 930, a display unit 940, a sensor 950, an audio circuit 960, a Wireless Fidelity (WiFi) module 970, a processor 980, a power supply 990, and other parts. A person skilled in the art may understand that a mobile phone structure illustrated in FIG. 7 is not intended to limit the mobile phone, and that the mobile phone may include parts more or fewer than those illustrated in the figure, or some parts may be combined, or the mobile phone may have different part arrangements.

Each component of the mobile phone will be specifically described below in conjunction with FIG. 7.

The RF circuit 910 may be configured to receive and transmit information. Usually, the RF circuit 910 includes, but is not limited to, an antenna, at least one amplifier, a transceiver, a coupler, an LNA, a duplexer, etc. In addition, the RF circuit 910 may further communicate with other devices via wireless communication and a network. The wireless communication may use any of communication standards or protocols, including, but not limited to, a Global System of Mobile communication (GSM), General Packet Radio Service (GPRS), Code Division Multiple Access (CDMA), Wideband Code Division Multiple Access (WCDMA), Long Term Evolution (LTE), an E-mail, Short Messaging Service (SMS), etc.

The memory 920 may be configured to store a software program and a module. The processor 980 executes various function APPs and data processing of the mobile phone by running the software program and the module stored in the memory 920. The memory 920 may mainly include a storage program region and a storage data region. The storage program region may store an operation system, an APP needed for at least one function (e.g., a program for releasing a dedicated memory resource), etc. The storage data region may store data (e.g., a preset duration) created according to use of the mobile phone. In addition, the memory 920 may include a high-speed RAM, and may further include a non-volatile memory such as a disk storage device, a flash device, or other non-volatile solid storage devices.

The input unit 930 may be configured to receive input digital or character information and generate key signal input associated with user setting and functional control of the mobile phone. Specifically, the input unit 930 may include a fingerprint recognition module 931 and other input devices 932. The fingerprint recognition module 931 may collect fingerprint data of a user thereon. Optionally, the fingerprint recognition module 931 may include an optical fingerprint module, a capacitive fingerprint module and a radio frequency fingerprint module. When the capacitive fingerprint module is taken as an example of the fingerprint recognition module 931, the capacitive fingerprint module specifically include sensing electrodes (including an abnormal sensing electrode and a normal sending electrode) and a signal processing circuit (e.g., an amplifier circuit, a noise suppression circuit, an analog-to-digital conversion circuit, etc.) connected to the sensing electrodes. The input unit 930 may further include, in addition to the fingerprint recognition module 931, other input devices 932. Specifically, the other input devices 932 may include, but are not limited to, one or more of a physical keyboard, a functional key (e.g., a volume control key and a switch key), a track ball, a mouse and an operating rod.

The display unit 940 may be configured to display information input by the user or information provided for the user, and various menus of the mobile phone. The display unit 940 may include a display screen 941. Optionally, the display screen 941 may be configured in a form of a Liquid Crystal Display (LCD), an Organic Light-Emitting Diode (OLED), etc. Although the fingerprint recognition module 931 and the display screen 941, as two independent parts, implement input and function output function of the mobile phone in FIG. 7 respectively, the fingerprint recognition module 931 and the display screen 941 may be integrated to implement the input function and output function of the mobile phone in some embodiments.

The mobile phone may further include at least one sensor 950 such as a light sensor, a motion sensor and other sensors. Specifically, the light sensor may include an ambient light sensor and a proximity sensor. The ambient light sensor may adjust the luminance of the display screen 941 according to the brightness of ambient light. The proximity sensor may close the display screen 941 and/or backlight when the mobile phone is moved to the proximity of an ear. As one of the motion sensors, an accelerometer sensor may detect the magnitude of an accelerated speed in each of directions (generally, three-axis). The accelerometer may detect the amplitude and direction of a gravity while the mobile phone is static. The accelerometer sensor may be further configured to identify an APP of a mobile phone gesture (e.g., switching between a horizontal screen and a vertical screen, relevant games, and magnetometer gesture calibration), and implement vibration-identification-related functions (e.g., pedometer and knocking). Other sensors such as a gyroscope sensor, a barometer sensor, a hygrometer sensor, a thermometer sensor and an infrared sensor configurable for the mobile phone will not be elaborated herein.

The audio circuit 960, a loudspeaker 961 and a microphone 962 may provide an audio interface between the user and the mobile phone. The audio circuit 960 may transmit an electric signal converted from the received audio data to the loudspeaker 961. The loudspeaker 961 converts the electric signal into a sound signal for output. Besides, the microphone 962 converts a collected sound signal into an electric signal. The audio circuit 960 converts the received electric signal into audio data and then outputs the audio data to the processor 980 for processing. The audio data is transmitted to another mobile phone via the RF circuit 910, or the audio data is output to the memory 920 for further processing.

WiFi belongs to a short-range wireless transmission technology. The mobile phone may assist the user in E-mail receiving and sending, webpage browsing, access to streaming media and the like by means of the WiFi module 970. The WiFi module provides a wireless wideband internet access for the user. Although FIG. 7 illustrates the WiFi module 970, it may be understood that the WiFi module 970 does not belong to necessary components of the mobile phone and can be totally omitted without changing the essence of the disclosure as required.

The processor 980 is a control center of the mobile phone. The processor is configured to connect all parts of the whole mobile phone by utilizing various interfaces and lines, to run or execute the software program and/or the module stored in the memory 920, and to call data stored in the memory 820 to execute various functions and processing data of the mobile phone, so as to wholly monitor the mobile phone. Alternatively, the processor 980 may include one or more processing units. Preferably, the processor 980 may be integrated with an application processor and a modulation-demodulation processor. The application processor mainly processes an operation system, a user interface, an application program and the like. The modulation-demodulation processor mainly processes wireless communication. It may be understood that the modulation-demodulation processor may not be integrated into the processor 980.

The mobile phone may further include a power supply 990 (e.g., a battery) for supplying power to each component. Preferably, the power supply may be connected with the logic of processor 980 via a power supply management system, so as to implement functions of charging, discharging and power consumption management by means of the power supply management system.

The mobile phone may further include a camera, a Bluetooth module (not shown) and the like, which will not be elaborated herein.

In the foregoing embodiments illustrated in FIG. 2, FIG. 3 and FIG. 4, each method flow may be implemented on the basis of the structure of the mobile phone.

In the foregoing embodiments illustrated in FIG. 5, the functions of various unit may be implemented on the basis of the structure of the mobile phone.

The embodiments of the disclosure also provide a computer storage medium. The computer storage medium may store a program. The program, when being executed by a processor, causes the processor to perform operations as illustrated in some or all blocks in any of communication methods in the abovementioned method embodiments.

It is to be noted that for simplifying the description, each of the abovementioned method embodiments is expressed as a series of action combinations. However, a person skilled in the art will understand that the disclosure is not limited by a described action sequence. That is because some operations shown in the blocks may be executed in other sequences or simultaneously according to the disclosure. Secondly, a person skilled in the art will also understand that the embodiments described in the specification fall within preferable embodiments, and involved actions and modules may not be necessary for the disclosure.

In the abovementioned embodiments, descriptions for each embodiment are emphasized respectively, and for parts which are not elaborated in a certain embodiment, reference may be made to relevant descriptions for other embodiments.

In some embodiments provided by the present application, it should be understood that the disclosed apparatus may be implemented in another manner. For example, the apparatus embodiment described above is only schematic. For example, division of the units is only logic function division, and other division manners may be adopted during practical implementation. For example, multiple units or components may be combined or integrated into another system, or some characteristics may be neglected or not executed. In addition, coupling or direct coupling or communication connection among the various displayed or discussed components may be indirect coupling or communication connection, implemented through some interfaces, of the device or the units, and may be electrical or adopt other forms.

The abovementioned units described as separate parts may or may not be physically separated. The parts displayed as units may or may not be physical units, and namely may be located in the same place, or may be distributed to multiple network units. Part or all of the units may be selected to achieve the purpose of the solutions of the present embodiment according to a practical requirement.

In addition, various function units in each embodiment of the disclosure may be integrated into a processing unit, or the various function units exist physically and independently, or two or more units may be integrated into a unit. The abovementioned integrated unit may be implemented in a form of hardware, or may be implemented in a form of software function unit.

When being implemented in form of software function unit and sold or used as an independent product, the integrated unit may also be stored in a computer-readable storage medium. Based on such an understanding, the technical solutions of the disclosure substantially or parts making contributions to the related art may be embodied in form of software product. The computer software product is stored in a storage medium, and includes a plurality of instructions configured to enable a computer device (which may be a personal computer, a server, a network device or the like) to execute all or part of the method in each embodiment of the disclosure. The abovementioned memory includes various media capable of storing program codes, such as a USB disk, a Read-Only Memory (ROM), an RAM, a mobile hard disk, a magnetic disk or an optical disk.

A person of ordinary skill in the art can understand that all or some operations as illustrated in the blocks in each method in the abovementioned embodiments may be completed by instructing relevant hardware through a program. The program may be stored in a computer-readable memory, and the memory may include a flash disk, an ROM, an RAM, a magnetic disk or an optical disk.

The above is detailed description for the embodiments of the disclosure. The principle and implementations of the disclosure are elaborated herein by adopting specific examples. The description for the abovementioned embodiments are only used to assist in understanding the method of the disclosure and the core idea thereof. Meanwhile, a person of ordinary skill in the art will change a specific implementation manner and an application scope according to the idea of the disclosure. To sum up, the contents of the present specification should not be interpreted as limitations to the disclosure.

The invention claimed is:

1. A communication method, applied to a mobile terminal comprising an Application Processor (AP) and at least two communication processors, each of the at least two communication processors being connected to the AP, each of the at least two communication processors capable of being connected to at least two peripheral devices of the mobile terminal, the mobile terminal having installed thereon a target application, the method comprising:
determining at least two peripheral devices needed for a data processing task of the target application;
allocating a customized communication processor to the at least two peripheral devices, the customized communication processor being one of the at least two communication processors comprised in the mobile terminal; and
when the data processing task of the target application is detected, calling the customized communication processor to perform the data processing task of the target application,
wherein the allocating a communication processor to the at least two peripheral devices comprises:
selecting a target communication processor, the target communication processor being one of the at least two communication processors comprised in the mobile terminal; and
determining the selected target communication processor as a preempted communication processor for at least two peripheral devices needed for the data processing task of the target application, the at least two peripheral devices of the target application having priority higher than that of other peripheral devices comprised in the mobile terminal in terms of using communication service of the preempted communication processor.

2. The method according to claim 1, further comprising:
determining a high-frequency usage time period of the target application, wherein
determining the selected target communication processor as a preempted communication processor for at least two peripheral devices needed for the data processing task of the target application comprises:
determining the communication processor with lowest usage frequency as a preempted communication processor for at least two peripheral devices needed for the data processing task of the target application within the high-frequency usage time period.

3. The method according to claim 2, wherein the determining a high-frequency usage time period of the target application comprises:
acquiring usage information about the target application within a predetermined time period; and
determining the high-frequency usage time period of the target application on the basis of the usage information about the target application within the predetermined time period.

4. The method according to claim 1, further comprising:
acquiring usage information about at least one application installed on the mobile terminal; and
determining an application, of which the usage information is greater than a predetermined usage information threshold, as the target application, according to the usage information about at least one application installed on the mobile terminal.

5. The method according to claim 4, wherein the usage information is a usage count of the at least one application within a predetermined time period, or a Central Processing Unit (CPU) occupancy during running of the at least one application.

6. A mobile terminal, comprising an Application Processor (AP) and at least two communication processor, each of the at least two communication processors being connected to the AP, each of the at least two communication processors capable of being connected to at least two peripheral devices of the mobile terminal, the mobile terminal having installed thereon a target application, the mobile terminal further comprising:
a memory configured to store readable instructions; and
one or more processors configured to execute the readable instructions to implement one or more units, the one or more units comprising:
a determination unit configured to determine at least two peripheral devices needed for a data processing task of the target application;
an allocation unit configured to allocate a customized communication processor to the at least two peripheral devices, the customized communication processor being one of the at least two communication processors comprised in the mobile terminal; and
a calling unit configured to call, when the data processing task of the target application is detected, the customized communication processor to perform the data processing task of the target application
wherein the allocation unit is specifically configured to select a target communication processor, the target communication processor being one of the at least two communication processors comprised in the mobile terminal; and determine the selected target communication processor as a preempted communication processor for at least two peripheral devices needed for the data processing task of the target application, the at least two peripheral devices of the target application having priority higher than that of other peripheral devices comprised in the mobile terminal in terms of using communication service of the preempted communication processor.

7. The mobile terminal according to claim 6, wherein the one or more processors are further configured to execute the readable instructions to implement a first learning unit configured to acquire usage information about the target application within a predetermined time period; and determine a high-frequency usage time period of the target application on the basis of the usage information about the target application within the predetermined time period.

8. The mobile terminal according to claim 6, wherein the one or more processors are further configured to execute the readable instructions to implement a second learning unit configured to determine a high-frequency usage time period of the target application; and
    wherein the allocation unit is specifically configured to determine, when determining the selected target communication processor as a preempted communication processor for at least two peripheral devices needed for the data processing task of the target application, the communication processor with lowest usage frequency as a preempted communication processor for at least two peripheral devices needed for the data processing task of the target application within the high-frequency usage time period.

9. The mobile terminal according to claim 8, wherein the second learning unit is configured to acquire usage information about the target application within a predetermined time period; and determine a high-frequency usage time period of the target application on the basis of the usage information about the target application within the predetermined time period.

10. The mobile terminal according to claim 6, wherein the one or more processors are further configured to execute the readable instructions to implement a target application determination unit configured to acquire usage information about at least one application installed on the mobile terminal; and determine an application, of which the usage information is greater than a predetermined usage information threshold, as the target application, according to the usage information about at least one application installed on the mobile terminal.

11. The mobile terminal according to claim 10, wherein the usage information is a usage count of the at least one application within a predetermined time period, or a Central Processing Unit (CPU) occupancy during running of the at least one application.

12. A mobile terminal, comprising N communication processors, an Application Processor (AP), M peripheral devices and a bus, wherein each of the N communication processors is connected to the AP via the bus, and each of the N communication processors is capable of being connected to at least two peripheral devices of the M peripheral devices, N being a positive integer greater than or equal to 2, and M being a positive integer greater than 2, the mobile terminal having installed thereon a target application; and
    the at least two peripheral devices communicate with each other via one of the N communication processors,
    wherein the AP is configured to: determine at least two peripheral devices needed for a data processing task of the target application; allocate a communication processor to the at least two peripheral devices, the communication processor being one of the N communication processors comprised in the mobile terminal; and call, when the data processing task of the target application is detected, the communication processor to perform the data processing task of the target application;
    wherein in the process of allocating the communication processor to the at least two peripheral devices, the AP is specifically configured to: select a target communication processor, the target communication processor being one of the N communication processors comprised in the mobile terminal; and determine the selected target communication processor as a preempted communication processor for at least two peripheral devices needed for the data processing task of the target application, the at least two peripheral devices of the target application having priority higher than that of other peripheral devices comprised in the mobile terminal in terms of using communication service of the preempted communication processor.

13. The mobile terminal according to claim 12, wherein the AP is configured to acquire usage information about the target application within a predetermined time period; and determine a high-frequency usage time period of the target application on the basis of the usage information about the target application within the predetermined time period.

14. The mobile terminal according to claim 13, wherein in the process of determining the selected target communication processor as a preempted communication processor for at least two peripheral devices needed for the data processing task of the target application, the AP is specifically configured to determine the communication processor with lowest usage frequency as a preempted communication processor for at least two peripheral devices needed for the data processing task of the target application within the high-frequency usage time period.

15. The mobile terminal according to claim 12, wherein the AP is configured to acquire usage information about at least one application installed on the mobile terminal; and determine an application, of which the usage information is greater than a predetermined usage information threshold, as the target application according to the usage information about at least one application installed on the mobile terminal.

16. The mobile terminal according to claim 15, wherein the usage information is a usage count of the at least one application within a predetermined time period, or a Central Processing Unit (CPU) occupancy during running of the at least one application.

\* \* \* \* \*